(12) United States Patent
Fickenscher et al.

(10) Patent No.: US 8,206,558 B2
(45) Date of Patent: Jun. 26, 2012

(54) APPARATUS FOR PROCESSING PROCESS OR INDUSTRIAL WASTEWATERS

(75) Inventors: Matthias Fickenscher, Lorrach (DE); Daniel Ladenberger, Maulberg (DE)

(73) Assignee: H20 GmbH, Steinen (DE)

( * ) Notice: Subject to any disclaimer, the term of this patent is extended or adjusted under 35 U.S.C. 154(b) by 760 days.

(21) Appl. No.: 12/278,052

(22) PCT Filed: Feb. 3, 2007

(86) PCT No.: PCT/EP2007/000935
§ 371 (c)(1),
(2), (4) Date: Aug. 1, 2008

(87) PCT Pub. No.: WO2007/090583
PCT Pub. Date: Aug. 16, 2007

(65) Prior Publication Data
US 2009/0050467 A1 Feb. 26, 2009

(30) Foreign Application Priority Data
Feb. 11, 2006 (DE) .......................... 10 2006 006 324

(51) Int. Cl.
*B01D 1/06* (2006.01)
*B01D 1/28* (2006.01)
*B01D 3/42* (2006.01)
*B01D 5/00* (2006.01)
*C02F 1/04* (2006.01)

(52) U.S. Cl. ........ 202/182; 159/24.1; 159/27.1; 159/44; 159/46; 159/DIG. 16; 202/160; 202/176; 202/181; 202/197; 202/200; 202/202; 202/205; 202/237; 203/2; 203/10; 203/22; 203/26; 203/91; 210/181; 210/187; 210/295; 210/DIG. 5

(58) Field of Classification Search .................. 159/24.1, 159/27.1, 44, 46, DIG. 16; 202/160, 176, 202/181, 182, 197, 200, 202, 205, 237; 203/2, 203/10, 11, 22, 26, 91, 100; 210/181, 187, 210/295, DIG. 5
See application file for complete search history.

(56) References Cited

U.S. PATENT DOCUMENTS

| 533,424 | A | | 2/1895 | Baldwin | |
|---|---|---|---|---|---|
| 2,487,884 | A | | 11/1949 | Lunt | |
| 3,236,748 | A | * | 2/1966 | Pottharst, Jr. | ................ 203/11 |
| 4,462,206 | A | * | 7/1984 | Aguet | ................ 60/39.182 |
| 5,772,850 | A | * | 6/1998 | Morris | ................ 202/237 |
| 6,846,388 | B2 | * | 1/2005 | Wilks | ................ 202/176 |
| 7,517,432 | B2 | * | 4/2009 | Catelli | ................ 159/27.1 |

FOREIGN PATENT DOCUMENTS

| GB | 382981 | 11/1932 |
|---|---|---|
| GB | 828664 | 2/1960 |
| GB | 935178 | 8/1963 |
| GB | 2126116 | 3/1984 |
| WO | 9203203 | 3/1992 |

* cited by examiner

*Primary Examiner* — Virginia Manoharan
(74) *Attorney, Agent, or Firm* — Volpe & Koenig, P.C.

(57) ABSTRACT

A processing apparatus (1) for the processing of process or industrial wastewaters is provided. The processing apparatus (1) has an evaporator (4) in which a tube bundle heat exchanger is provided, whose pure distillate side is connected to a separating apparatus for separating the distillate from floating organic phase or similar free liquid constituents. This separating apparatus is intended to collect the floating organic phase from the condensate, in order that this phase can be sucked back into the evaporator (4). In addition, the vapor mixture is conducted from the separating apparatus (8) to a recuperator (3) and cooled to such an extent that the water, the volatile solvents and the organic material dissolved in the vapor can be condensed and discharged separately or can be sucked back into the evaporator (4). This allows significantly better distillate qualities to be achieved.

11 Claims, 2 Drawing Sheets

APPARATUS FOR PROCESSING PROCESS OR INDUSTRIAL WASTEWATERS

BACKGROUND

The present invention relates to a device for processing process or industrial wastewater developing in manufacturing, for example.

In a variety of manufacturing, process wastewater develops, in which oils, solvents, or other processing residue is included in the water or another liquid. It is necessary to clean such processing wastewaters for either recycling these process wastewaters for the processing cycles or allowing their discharge to the sewer system. Here, particularly for the discharge into the sewer system, sometimes statutory limits have to be observed as well.

In order to increase the purity of the above-mentioned distillation methods several cleaning steps can be performed consecutively, however this considerably increases the expense for equipment and the space needed. In general it can be said that the expenses connected to cleaning process wastewater increases disproportionably the higher the targeted purity.

The present invention relates to a one-step distillation process which is provided with a closed energy circuit for reducing the application of energy. Processing devices having an evaporator are already known which are formed by a tube bundle heat exchanger. Due to the fact that each distillate continues to show a content of volatile oils to a greater or lesser extent, with here oil being mentioned only as an example for other volatile polar and non-polar hydrocarbons, the processing devices of prior art comprise coalescing bodies provided perhaps with rock wool or interlaced stainless steel to reduce, for example, the portion of oil in the distillate in wastewater purification. However, such coalescence chambers of prior art cannot prevent the oil-water mixture from containing oil to a greater or lesser extent. Although the portion of free oil in the distillate floats and can be skimmed off, the remaining distillate may still represent a comparatively stable oil-water emulsion.

SUMMARY

Therefore, the object is to provide a processing device for processing process or industrial wastewater by which the statutory wastewater limits can be easily met.

This object is attained according to the invention in a processing device having a tube bundle—heat exchanger provided in its evaporator, with its side of the purified distillate being connected to a separating device for separating the distillate from floating free liquid components, providing that the separating device and the tube bundle—heat exchanger located in the evaporator are arranged and/or connected to each other in a non-deflective manner such that the level of the liquid in the separating device and in the evaporator flow over the same height. Due to the fact that the condensate developing at the output of the tube bundle—heat exchanger and comprising an aqueous phase as well as a floating organic phase, e.g., oil, is guided practically without any deflection and seamlessly into the separating device any mixture of these two phases is avoided, which otherwise would facilitate the formation of a stable emulsion and/or dispersion. Therefore, the floating organic phase can be collected from the condensate in the separating device so that this phase can then be suctioned back into the evaporator by the vacuum. Furthermore, the vapor mixture can be guided from the tube bundle—heat exchanger to an additional recuperator or a similar heat exchanger and be cooled such that both water as well as the highly volatile solvents and any organic chemicals dissolved in the vapors condense and are removed separately and/or be suctioned off back into the bottom of the evaporator. This way a considerably better quality of distillates can be yielded.

A further solution worthy of protection and relating to a processing device with a compressor compressing the purified vapors originating in the evaporator provides that the compressor compresses the purified vapor originating in the evaporator to an approximately atmospheric pressure. Due to the fact that in this solution the purified vapor is not compressed excessively but only to an approximately atmospheric pressure before it can be condensed in a tube bundle—heat exchanger for example, the formation of a stable oil-vapor mixture is counteracted.

The above-mentioned solutions can also be implemented in a heat pump evaporator. However, an embodiment is performed in which for the purpose of evaporation the evaporator is determined via mechanic vapor compression.

Another solution according to the invention also relating to a processing device having a compressor, in which purified vapors originating in the evaporator are compressed, provides that a temperature sensor is provided in the suction and/or pressure line of the compressor, that a distillate line originating in the separating device mouths into the suction line of the compressor, with a control valve being interposed, and that for cooling the compressor the control valve provided is in controlled connection to the temperature sensor such that the control valve opens or closes depending on the temperature detected by the temperature sensor. Here, the temperature sensor and the control valve form a control circuit providing the cooling necessary for the vapor compressor by constantly injecting distillate.

Here, it is particularly advantageous for the valve to be a proportional valve that can be opened depending on the temperature detected by the temperature sensor in order to create constant processing conditions that counteract the formation of an emulsion, dispersion, or suspension.

Another solution relating to a processing device with an evaporator in which a tube bundle—heat exchanger is provided, with its side of the purified distillate being connected to a separating device for separating the distillate from a floating organic phase or similarly free liquid components, provides that an automatic leveling is arranged at the separating device which opens a pressure release valve when a liquid level is fallen short of and which closes the pressure valve when a liquid level is exceeded. The inert gases originating in the evaporator as well as non-condensed, highly volatile vapors can lead to an undesired increase of pressure in the separating device. An increased pressure leads to the risk, though, that the organic liquid components floating on the distillate may once more bond with the other liquid and form an emulsion, dispersion, or a suspension. An excessive increase in pressure in the separating device is avoided by an automatic leveling provided in the separating device; the liquid level is pressed downwards by the inert gas collected in the separating device and the evaporator. When a liquid level falls short due to the gas pressure rising in the separating device another spring-loaded pressure release valve is opened which only closes again when an also predetermined liquid level is fallen short. Due to the fact that this automatic leveling provided in the separating device creates processing conditions of constant pressures both in the evaporator as well as in the separating device connected thereto, the targeted slow-flow construction of the processing device according to the invention is considerably facilitated.

Here, it is particularly advantageous for the pressure release valve to be interposed in a pressure release line preferably originating in the evaporator. By opening the pressure release valve interposed in the pressure release line any excess pressure existing in the separating device as well as the evaporator can be removed via the evaporator and the pressure can be kept constant in the processing device according to the invention.

In order to allow gaseous portions to be removed, collected in the separating device as well as in the evaporator at an appropriate increase in pressure, it is beneficial when the inlet opening leading to the pressure release valve is arranged in the tube bundle—heat exchanger of the evaporator above the upper liquid level.

Another solution relating to a processing device, having an evaporator in which a tube bundle—heat exchanger is provided with its side of the purified distillate being connected to a separating device for separating the distillate from the floating organic phase or similarly free liquid components, provides that the separating device is connected via a pipeline to the side of the purified vapor of the tube bundle—heat exchanger and/or to the bottom of the evaporator and that the inlet opening of this pipeline for separating floating liquid components is arranged at a distance above the upper maximal liquid level. This way, the organic phase floating in the separating device can be fed to the bottom of the evaporator via the pipeline and thus once more be subjected to the processing process, while the distillate located below the organic phase in the separating device can be supplied for further applications or processing steps.

Another solution relating to the processing device having an evaporator in which a tube bundle—heat exchanger is provided, provides that its pressure release line is guided via a recuperator or a similar heat exchanger connected to a waste water pipeline leading to the evaporator for cooling non-condensed, highly volatile vapors. This way, non-condensed, highly volatile vapor components can be cooled by the process wastewater flowing towards the evaporator while the process wastewater to be processed is heated to a temperature slightly falling short of the evaporation level. In this way, even the highly volatile vapor components, such as for example alcohol or ammonia, can be condensed and separated in the recuperator. The recuperator facilitates the low energy consumption in the processing device according to the invention and allows for the predetermined wastewater limits to be undershot by a considerable margin.

In order to additionally improve the quality of the condensate it is advantageous when a coalescence step and/or at least one activated carbon filter is arranged downstream in reference to the recuperator or a similar heat exchanger.

Here, a preferred further embodiment according to the invention provides that a temperature sensor is provided in the pressure release line, preferably in the line section downstream in reference to the recuperator or a similar heat exchanger, which triggers the removal of the residue developing in the evaporator during the distillation when a predetermined maximum value is exceeded.

BRIEF DESCRIPTION OF THE DRAWINGS

In the following, the above-mentioned solutions are described in greater detail using a preferred exemplary embodiment.

Shown are.

DETAILED DESCRIPTION OF THE PREFERRED EMBODIMENTS

Figure 1:
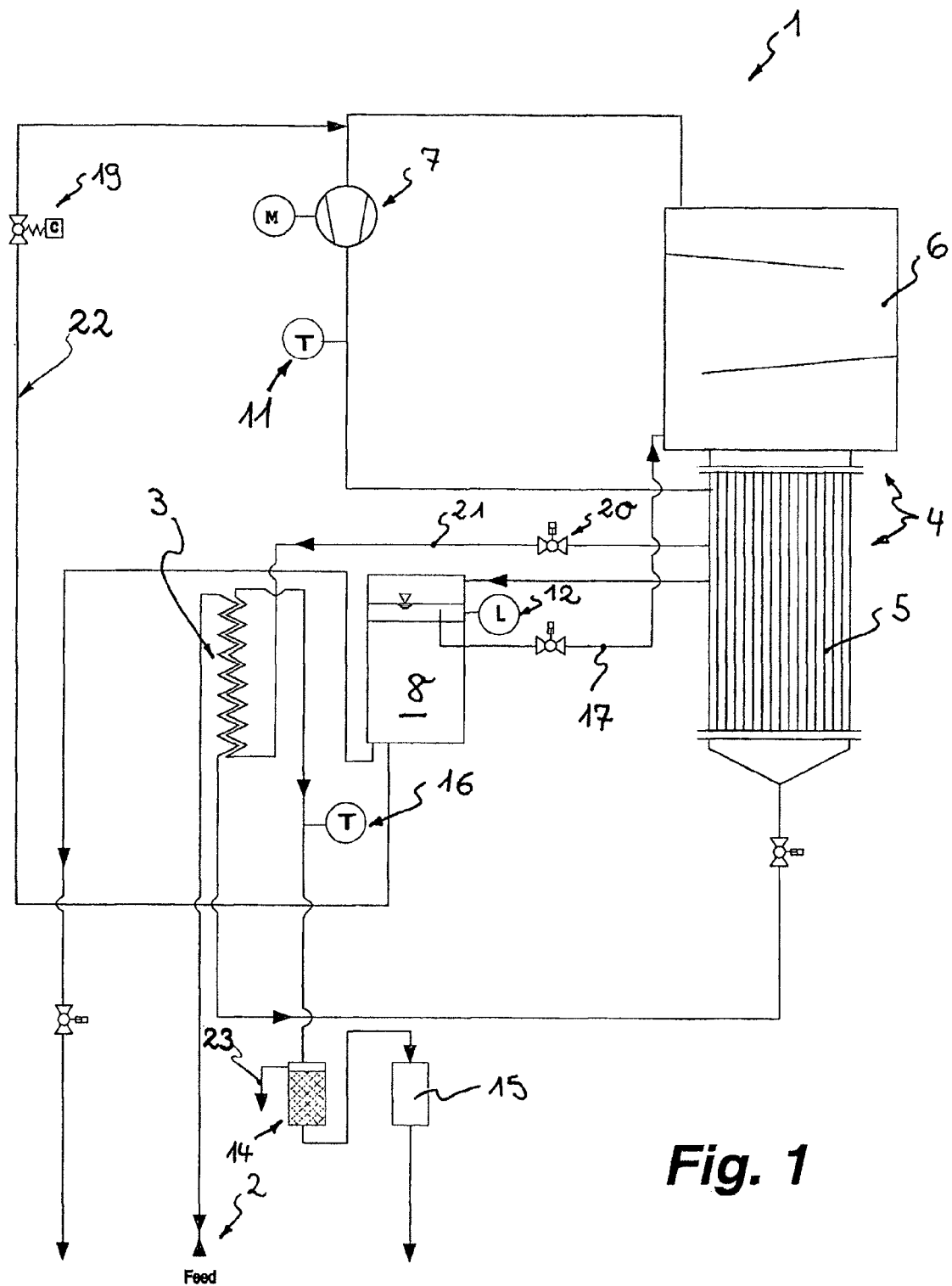
FIG. 1 is a principle flow chart of a processing device, in which process or industrial wastewater can be processed in an evaporator via mechanical vapor compression.

FIG. 1 shows the essential components of an evaporator device 1 in a principle flow chart. The liquid to be processed or retrieved in the evaporator device 1 is suctioned via a wastewater inlet 2 and enters the recuperator 3, in which the process water to be processed cools the vapor components originating in an evaporator 4 and comprising inert gas as well as non-condensed, highly volatile materials, and which thus heats to a temperature slightly falling short of the evaporation limit.

From here, the process wastewater is suctioned into the evaporator 4 by the vacuum created by it. A tube bundle—heat exchanger 5 with purified vapor flowing through it is arranged in the evaporator 4, where the liquid can be heated further and evaporate. Here, contaminants as well as less volatile liquids remains as a residue and are automatically removed via an outlet valve as soon as a certain concentration is reached.

The purified vapor developing from the process wastewater and cleared of contaminants as well as less volatile liquids is suctioned by a compressor 7 via a separator 6 in order to be compressed by the compressor 7 from a few 100 millibar to at least atmospheric pressure and is fed to the tube bundle—heat exchanger 5 located in the evaporator 4. In this condenser the purified vapor condenses and releases the developing condensation energy to the environmental liquid of the tube bundle.

Figure 2:
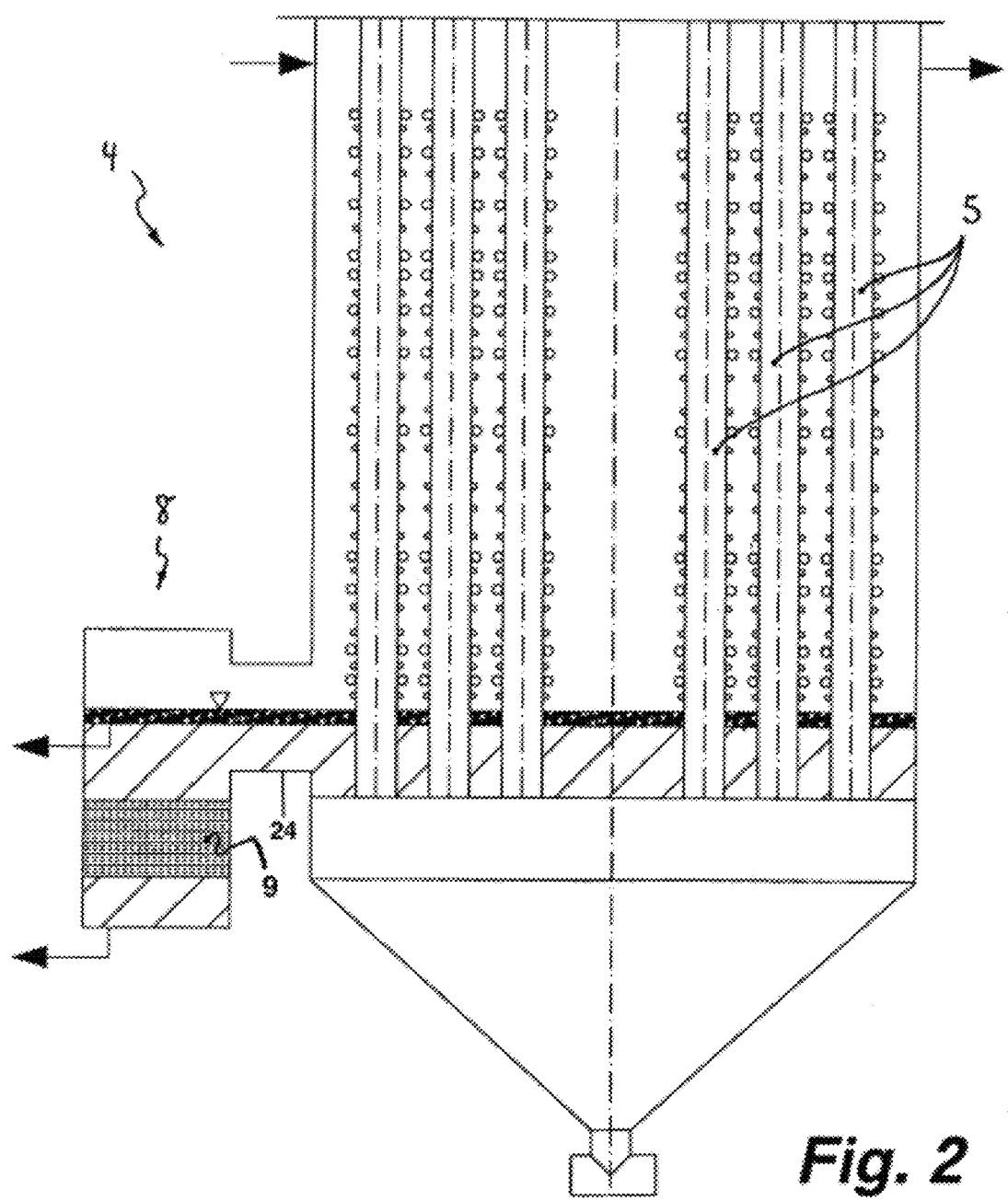
FIG. 2 is a view of the evaporator of the processing device shown in FIG. 1 in the area of the bottom of its evaporator.

The evaporator 4 as well as the separating device 8 connected thereto are shown in FIG. 2. The vapor condenses in the tube bundle—heat exchanger 5 such that the distillate can collect at the bottom of said tube bundle—heat exchanger 5; here the tube bundle—heat exchanger 5 is connected to the separating device 8 such that the organic phase floating on the distillate is separated from the distillate and the distillate additionally can be further cleansed of free oil portions by a coalescing body 9, provided in the separating device 8 and for example comprising rock wool or interlaced stainless steel. Here, the evaporator 4 and the separating device 8 are connected to each other in a deflection free manner, above an overflow 24, such that the liquid level in the separating device 8 on the one hand, and in the evaporator 4 on the other hand, flow over at the same height. By this deflection free and thus slow-flow connection of the evaporator 4 and the separating device 8 any renewed undesired mixture of the organic phase with the highly volatile vapors in the condensate is counteracted.

A portion of the distillate located in the separating device 8 is used to cool the compressor 7, for example embodied as a rotary piston pump. For this purpose, the separating device 8 is connected to a compressor 7 via a line 22, at its suction side provided with a proportional valve 11. For this purpose, a temperature sensor 11 is provided in the pressure line originating in the compressor 7, detecting the end temperature of the compression and, depending on the temperature determined, opening the proportional valve such that the compression end temperature is lowered to a predetermined target value and kept constant.

Due to the fact that the processing process in the processing device is embodied as a closed system, any increasing enrichment of non-condensed inert gases and highly volatile vapors in the tube bundle—heat exchanger 5 could lead to an appropriate increase in pressure. The amount of inert gas increasing during the processing process presses the distillate in the separating device 8 under a defined liquid level. Automatic leveling 12 is provided in the separating device 8, opening a pressure release valve 20 interposed in a pressure release line 21 leading to the evaporator 4 when a certain liquid level is fallen short, until said pressure release valve 20 can be closed again, when a predetermined liquid level is exceeded in the separating device 8. By this level-regulated release of the separating device 8 as well as the evaporator 4 connected thereto the undesired formation of oil-containing emulsions, dispersions, or suspensions is counteracted.

The removed inert gases as well as the highly volatile vapors can be removed from the evaporator 4 via the pressure release line 21 and cooled in the recuperator 3 and condensed. They can form stable emulsions and be guided to a coalescence step 14 serving as an oil-separator, where the inert gases are removed as exhaust via the gas outlet 23. The remaining condensate is finally guided through an activated carbon filter 15, before the condensate cleaned in such a fashion is fed to further processing or discharged to the sewer system.

Due to the fact that the condensate developing in the recuperator 3 may contain greater amounts of potentially also oily contaminants per volume unit in reference to the distillate, the consumption of activated carbon in the activated carbon filter 15 can be considerably reduced, because only a highly charged partial flow of the condensate, traveling through the pressure release valve 21, is guided through the activated carbon and thus the activated carbon can be subjected to a higher level of contaminants. Due to the fact that the condensate traveling through the pressure discharge line 21 represents only approximately 10 percent of the volume of the distillate and that the activated carbon can be charged by said condensate to a higher extent the activated carbon filter 15 can be embodied comparatively small and compact.

The residue remaining in the evaporator 4 at the bottom of the evaporator during the processing process is automatically removed via the above-mentioned outlet valve. In order to determine the time for removing the residue depending on a processing parameter, the temperature of the condensate originating in the evaporator 4 and cooled in the recuperator 3 is measured by a temperature sensor 16 before the condensate is fed for further processing to the coalescence step 14 and the subsequent activated carbon filter 15. The temperature of this condensate increases with any further condensation of the residue remaining in the evaporator 4. When the temperature of the condensate reaches a predetermined maximum value the removal of the residue remaining in the evaporator 4 is triggered by the outlet valve opening.

Any portion of oil potentially still floating in the separating device 8 is suctioned off and either recycled into the bottom of the evaporator or, via the pipeline 17, into the separator 6, in order once more to be fed to the processing process. The purified vapor originating in the evaporator 4 is compressed via the compressor 7 only to approximately atmospheric pressure, which counteracts the formation of any undesired oil-water emulsion.

The invention claimed is:

1. A device for processing process or industrial wastewater comprising an evaporator (4) having a heating side, the evaporator (4) is operated by vapor, which is condensed on the heating side during operation, the evaporator comprising a separating device (8) and a tube bundle—heat exchanger (5) having a side for purified distillate connected to the separating device (8) for separating the distillate from a floating organic phase or free liquid components, the separating device (8) and the distillate side of the tube bundle—heat exchanger (5) located in the evaporator (4) are connected to each other without any deflections above an over flow (24) such that, in use, a liquid level in the separating device (8) and in the evaporator (4) merge with one another at the same height, the separating device (8) comprising a pressure relief valve (20) and a leveling device (12), in communication with the pressure relief valve (20), which opens the pressure relief valve (20) when the liquid falls below a set level and closes the pressure relief valve (20) when the liquid exceeds a set level.

2. A device according to claim 1, further comprising a compressor (7) which compresses purified vapor originating in the evaporator (4), to approximately atmospheric pressure.

3. A device according to claim 2, wherein a temperature sensor (11) is arranged in a suction or pressure line of the compressor (7), a distillate line (22), originating in a separating device, opens into the suction line of the compressor (7), with a control valve (19) being interposed, and to cool the compressor (7), the control valve (19) is in a controlled connection to the temperature sensor (11) for cooling the compressor (7) such that the control valve (19) opens or closes depending on a temperature detected by the temperature sensor (11).

4. A device according to claim 3, wherein the control valve (19) is a proportional valve that can be opened depending on the temperature detected by the temperature sensor (11).

5. A device according to claim 1, wherein for evaporation the evaporator (4) utilizes mechanical vapor compression.

6. A device according to claim 1, wherein the pressure release valve (20) is interposed in a pressure release line (21) originating in the evaporator (4).

7. A device according to claim 6, wherein an inlet opening leading to the pressure release valve (20) is arranged in the evaporator (4).

8. A device according to claim 1, wherein the separating device (8) is connected to a bottom of a separator (6) via a pipeline (17) and an inlet opening of said pipeline is arranged at a distance below an upper maximum liquid level for separating the organic phase or floating free liquid components.

9. A device according to claim 1, wherein, with a pressure release line (21) connected to the tube bundle—heat exchanger (5) is guided via a recuperator (3) or a heat exchanger connected to a sewer line that leads to the evaporator (4) for cooling inert gas as well as non-condensed, highly volatile vapor components.

10. A device according to claim 9, wherein at least one active carbon filter (15) is provided downstream in reference to the recuperator (3) or the heat exchanger.

11. A device according to claim 9, wherein a temperature sensor (16) is provided in a line section downstream in reference to the recuperator (3) or the heat exchanger connected to the pressure release line (21), which, when a predetermined maximum value is exceeded, the temperature sensor (16) triggers removal of a residue developing in the evaporator (4) during the distillation.

* * * * *